(12) United States Patent
Suzuki et al.

(10) Patent No.: US 7,062,775 B2
(45) Date of Patent: Jun. 13, 2006

(54) ACTUATOR FOR AN OPTICAL PICKUP

(75) Inventors: Jun Suzuki, Tokorozawa (JP); Eiji Kuroki, Tokorozawa (JP); Kazutaka Goami, Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 359 days.

(21) Appl. No.: 10/210,136

(22) Filed: Jul. 31, 2002

(65) Prior Publication Data

US 2003/0026191 A1 Feb. 6, 2003

(30) Foreign Application Priority Data

Jul. 31, 2001 (JP) ............................. 2001-232824

(51) Int. Cl.
*G11B 7/08* (2006.01)
*G11B 21/16* (2006.01)

(52) U.S. Cl. .................................. 720/683; 369/44.22

(58) Field of Classification Search ............ 369/244.1, 369/112.23; 360/240, 290, 294, 294.1, 294.3, 360/294.5; 720/683, 681, 672
See application file for complete search history.

(56) References Cited

U.S. PATENT DOCUMENTS

| 4,614,929 A | 9/1986 | Tsukuda et al. |
| 5,062,095 A | 10/1991 | Horikawa et al. |
| 5,555,228 A | 9/1996 | Izuka |
| 5,659,215 A * | 8/1997 | Dunfield et al. ....... 310/154.21 |
| 5,986,983 A | 11/1999 | Simpson et al. |
| 6,198,605 B1 * | 3/2001 | Briggs et al. ............ 360/266.7 |
| 6,344,936 B1 * | 2/2002 | Santo et al. ................ 359/824 |
| 6,392,845 B1 * | 5/2002 | Tsuda et al. ............. 360/264.9 |
| 6,504,813 B1 * | 1/2003 | Suzuki et al. ............... 720/683 |
| 6,785,065 B1 * | 8/2004 | Song et al. ................. 359/814 |

FOREIGN PATENT DOCUMENTS

| EP | 1 098 304 A2 | 5/2001 |
| EP | 1 124 222 A2 | 8/2001 |
| JP | 11-185265 | 7/1999 |

* cited by examiner

*Primary Examiner*—Angel Castro
(74) *Attorney, Agent, or Firm*—Nixon & Vanderhye P.C.

(57) ABSTRACT

A magnet used for an actuator of an optical pickup has a magnetization pattern with two different pole areas adjacent each other. At a corner part defined by the boundary line of the two pole areas, the pole area inside the corner part has a projection area, projecting in the direction of the pole area outside the corner part. Owing to the existence of the projection area, insufficiency of the magnetic flux density at the corner part particularly close to the vertex can be improved so that a desirable magnetic field can be provided to the printed coil substrate disposed in the vicinity of the magnet.

5 Claims, 6 Drawing Sheets

ACTUATOR FOR AN OPTICAL PICKUP

BACKGROUND OF THE INVENTION

1. Field of the Invention

The present invention belongs to the technical field of an optical pickup for a disc player for recording information on a disc and reproducing the information from the disc, and particularly relates to a magnet to be used in an actuator of an objective lens.

2. Description of Related Art

An optical pickup device used for recording information on an optical disc or reproducing the information therefrom generally includes an objective lens and an actuator (lens driving device) for driving the objective lens. The actuator moves the objective lens in a focus direction and a tracking direction to correct the relative positional relationship of the objective lens with respect to the information recording surface of the disc and the track formed on the information recording surface. That is, the actuator adjusts the distance between the objective lens and the information recording surface of the disc based on a focus error signal so that a light spot of a predetermined size is formed on the information recording surface of the disc. Moreover, the actuator adjusts the position of the objective lens in the disc radial direction based on a tracking error signal so that a light spot is positioned correctly on the track of the information recording surface of the disc.

According to the known actuator, the position control of the objective lens in the focus direction and the tracking direction are executed by the electromagnetic force generated by the control current flowing in a coil formed on a printed circuit board and a magnet disposed adjacent to the coil.

A coil substrate provided with a focus coil and two tracking coils is mounted on a lens holder for supporting an objective lens, and such a lens holder is disposed within the magnetic field generated by a magnet. When the control current flows through the focus coil and the tracking coils, a driving force of the lens holder is generated and the lens holder is moved in the focus direction and the tracking direction. By controlling the polarity and the amount of the control current applied to the focus coil and the tracking coils, the objective lens can be disposed at the right position with respect to the information recording surface and the information recording track of an optical disc.

The magnet is magnetized, in advance, to a predetermined pattern by a magnetizing device. For example, in the case of a conventional actuator, in order to provide an appropriate magnetic field to a focus coil and two tracking coils, the magnet is magnetized using a magnetizing core with a "U"-shaped pattern.

However, in the case where the magnet is magnetized using the magnetizing core of a "U"-shaped pattern as mentioned above, since decrease of the magnetic flux density cannot be avoided at the position of the coil substrate position, disposed adjacent to the magnet, corresponding to the corner part of the "U"-shaped magnetizing core, the magnetic field cannot be generated in an ideal pattern at the coil substrate position. Therefore, there is a such problem that the sensitivity of the actuator is deteriorated or an adverse effect is given to the rolling characteristic.

SUMMARY OF THE INVENTION

In view of the above-mentioned problems, the present invention has been achieved, and an object thereof is to provide an actuator representing a preferred driving characteristic by magnetizing a magnet by a magnetization pattern that provides an ideal magnetic flux density distribution at a position where a coil substrate disposed. Moreover, another object of the present invention is to provide a such magnetizing device for obtaining the magnet.

According to one aspect of the present invention, there is provided an actuator having a magnetization pattern including two different pole areas adjacent with each other, wherein at a corner part defined by a boundary line of the two pole areas, the pole area inside the corner part has a projection area which projects in the direction of the pole area outside the corner part.

In accordance with the above magnet, a magnetization pattern is formed by the two pole areas formed on the magnet adjacent with each other, for example, an N pole and an S pole. The boundary of the pole areas has corner parts in addition to the straight part such that the inner side pole area is projected to the outside pole area at the corner part. Therefore, owing to the existence of the projection area, insufficiency of the magnetic flux density at a position of the corner part, particularly at a point close to the vertex, at a position of a printed coil substrate disposed by a predetermined distance from the magnet is improved, and a desirable magnetic field can be provided to the tracking coils formed on the printed coil substrate.

In an embodiment, the projection area may have a planar shape of an arc. By this, production of the magnetizing core for forming the magnetization pattern in the magnet can be facilitated. Moreover, since the corner part with a magnetizing core wound around is curved, breakage of the magnetizing coil, or the like can be prevented.

The center of the arc may be provided outside of a corner part of another arc which is defined by connecting two straight lines forming the corner part with an arc.

According to this feature, since the corner part can be provided in a sufficiently moderate ark-like shape and further the corner part of the magnetizing core can be formed in a round shape, design and production can be facilitated compared with the case of forming a complicated curved shape.

The projection area may be formed in a polygonal planer shape. Since the magnetizing core corner part can be shaped in a predetermined polygon, design and production can be facilitated compared with the case of forming a complicated curved shape.

At the corner part with the projection area disposed, the magnetization pattern may be formed such that a boundary line of the magnetic flux density distribution at a predetermined distance from the magnet substantially coincides with an intersection shape of the two straight lines of the boundary line of the two pole areas defining the corner part.

According to this feature, since the magnetic flux density distribution generated on the printed coil substrate really disposed by a predetermined distance from the magnet provides an ideal boundary at the corner part, a desirable magnetization characteristic can be realized for the magnet.

According to another aspect of the present invention, there is provided an actuator for an optical pickup, including the two magnets described above; a lens holder having an objective lens and two coil substrates mounted on its side surface; and a holding device for holding the lens holder movably between the magnets such that the two coil substrates face each of the two magnets.

In accordance with the above actuator, by the function of the magnet having a desirable magnetization pattern and the coil substrates mounted on the lens holder, the characteristics of the actuator can be improved.

The coil substrates may have a focus coil and two tracking coils, and the boundary line of the two pole areas may have three straight line parts and two corner parts defined by the three straight line parts such that the lens holder is held by the holding device such that one of the three straight line parts faces the focus coil and the other two of the three straight line parts face each of the two tracking coils.

According to this feature, since a desirable magnetic field is generated at the focus coil and tracking coil positions by the magnet, accurate focusing and tracking controls can be realized.

According to still another aspect of the present invention, there is provided a magnetizing device for magnetizing a magnetic substance in a predetermined magnetization pattern, including two magnetizing cores disposed with a predetermined interval, wherein each of the magnetizing cores has different poles such that the cross-sectional shape of the magnetizing cores corresponding to the magnetization pattern has a projection area, and wherein at a corner part defined by the boundary line of the two core parts, the core part inside the corner part is projected in the direction of the core part outside the corner part.

In accordance with the above magnetizing device, by disposing the magnetic substance between the two magnetizing cores for magnetizing the magnetic substance, a magnet can be obtained. Here, each of the magnetizing cores has two different core parts having different poles such that the core part on the inner side has a shape projecting in the direction of the outer side core part at the corner part of the boundary thereof. Therefore, the magnetization characteristic of the corner part can be improved so as to provide a desirable magnetic field at the position of the printed coil substrate.

In an embodiment, the projection area may have an arc-like shape, and the magnetizing device may further include a magnetizing coil wound around each of the core parts and a magnetizing power source for energizing the magnetizing coil.

According to this feature, the magnetic substance can be magnetized by providing a high voltage from the magnetizing power source to the magnetizing coils. Here, since the projection area of the magnetizing cores has an arc-like shape, the mechanical stress on the magnetizing coil wound around thereat can be alleviated so that the durability of the magnetizing coils and thereby the durability of the magnetizing device itself can be improved.

The nature, utility, and further features of this invention will be more clearly apparent from the following detailed description with respect to preferred embodiment of the invention when read in conjunction with the accompanying drawings briefly described below.

DESCRIPTION OF THE PREFERRED EMBODIMENTS

Hereinafter, a preferred embodiment of the present invention will be explained with reference to the drawings.

[1] Actuator

Figure 1:
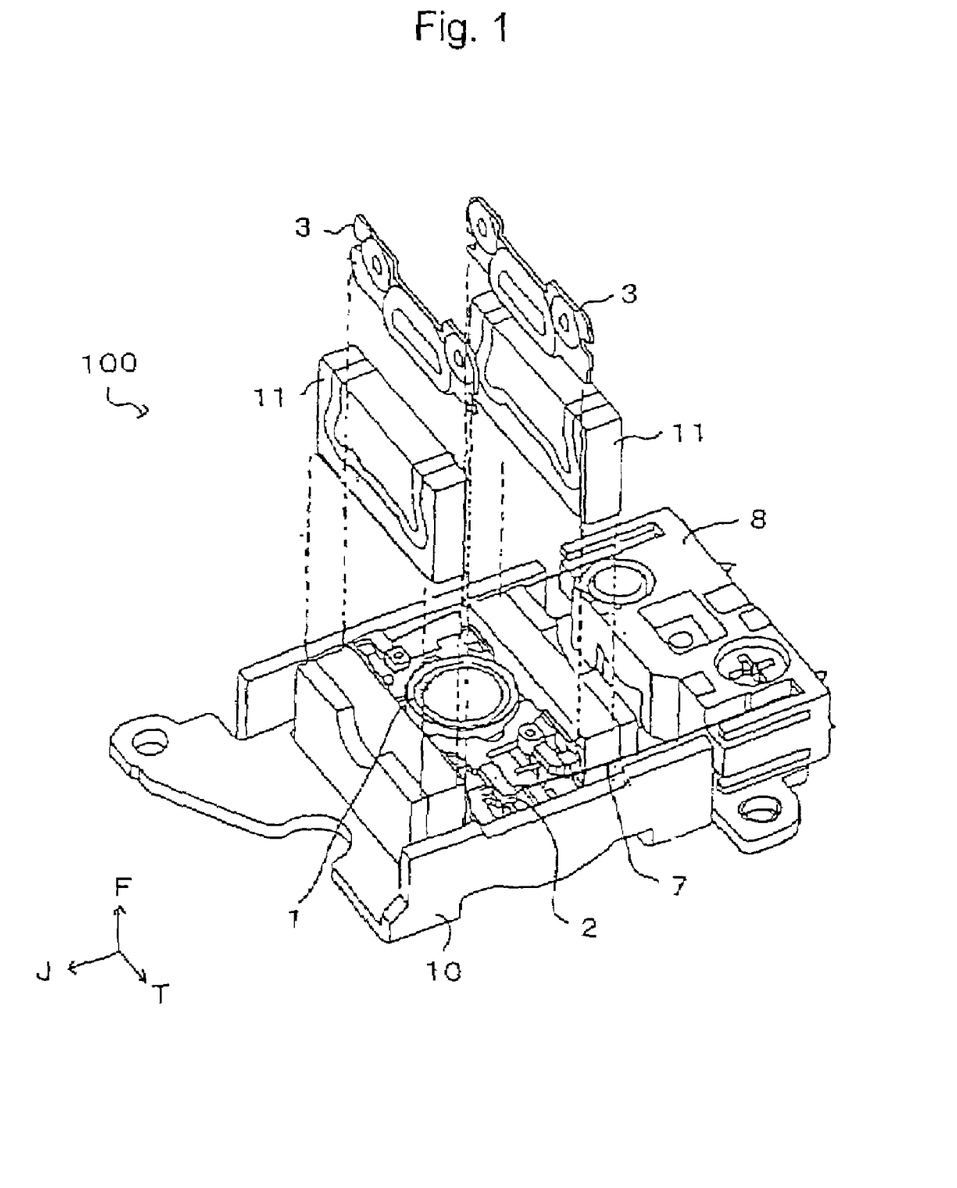
FIG. 1 is a perspective view showing the structure of an actuator according to an embodiment of the present invention.

FIG. 1 shows the configuration of an actuator 100 according to an embodiment of the present invention. The actuator is used for an optical pickup of an information recording and reproducing device for recording information in various kinds of optical discs such as a CD (compact disc), a CD-R (CD-recordable), a DVD, a DVD-R (DVD-recordable) and a DVD-RW (DVD-rewritable), or reproducing the information from the optical discs.

As shown in FIG. 1, the actuator 100 includes a lens holder 2, an actuator yoke base 10 and a base 8. An objective lens 1 is fixed to the lens holder 2. The objective lens 1 collects an emitted light from a light source (not shown) provided below the actuator 100 and directs the light to the information recording surface of an optical disc. The objective lens 1 also transmits a reflected light from the information recording surface of the optical disc and guides the reflected light to an optical system such as a beam splitter. Therefore, the lens holder 2 is provided with a space without a member so as to allow transmission of the emitted light and the reflected light below the objective lens 1.

Figure 2:
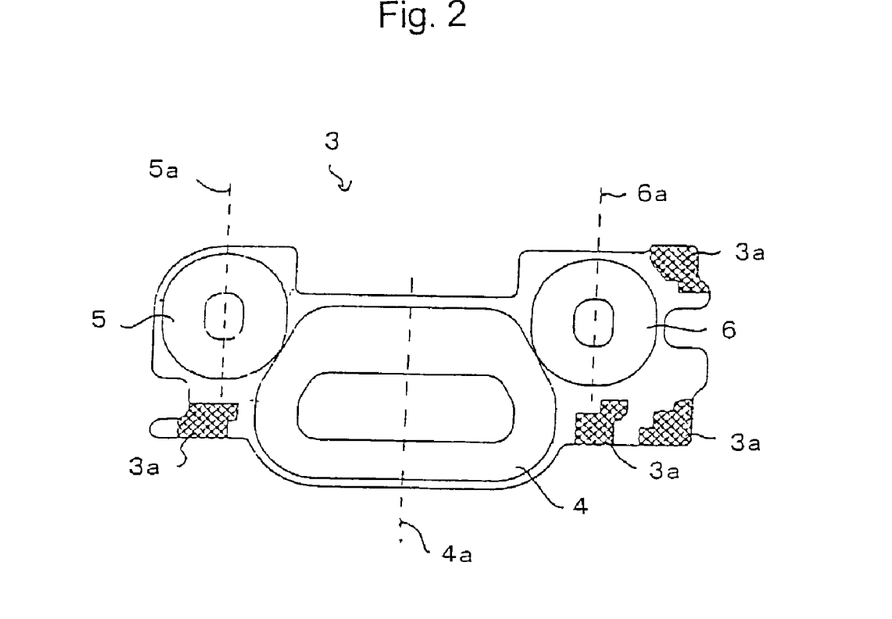
FIG. 2 is a plan view showing a printed coil substrate used for the actuator of FIG. 1.

Moreover, a pair of printed coil substrates 3 is fixed on the side surfaces of the lens holder 2 by bonding and/or soldering. As shown in FIG. 2, the printed coil substrate 3 has a focus coil 4 and a pair of tracking coils 5 and 6. Details of the printed coil substrates 3 will be described later.

The lens holder 2, to which the objective lens 1 and the printed coil substrates 3 are fixed, is connected with the base 8 by a plurality of suspension wires 7. The suspension wires 7 have flexibility so that the lens holder 2 can be movably supported by the base 8 via the plurality of the suspension wires 7 in a fashion of a cantilever. The suspension wires 7 may be designed to additionally have a function as a power supply line of the driving current to the focus coil 4 and the tracking coils 5, 6.

A pair of magnets 11 made of a magnetic substance is fixed on the actuator yoke base 10 by bonding. The pair of the magnets 11 is magnetized preliminarily in a predetermined magnetization pattern by a magnetizing device later described, and is fixed on the actuator yoke base 10 so as to face with each other. Thereby, a predetermined magnetic field is generated in the vicinity of the magnets 11 corresponding to the magnetization pattern of the magnets 11.

The lens holder 2 movably supported by the base 8 via the suspension wires 7 is disposed between the pair of the magnets 11. Since the printed coil substrates 3 are fixed on the side surfaces of the lens holder 2, the lens holder 2 can be moved in the focusing direction F and the tracking direction T in FIG. 1 by applying a driving current of predetermined polarity and amount to the focus coil 4 and the tracking coils 5, 6 provided on the printed coil substrates 3 within the magnetic field generated by the magnets 11.

That is, by flowing the current through the focus coil 4 within the magnetic field by the magnets 11, a driving force of the lens holder 2 is generated in the focusing direction F, that is, in the direction for moving the objective lens 1 toward or away from the information recording surface of the optical disc. Thereby, the focus control can be executed. Further, by flowing a current of predetermined direction and amount through the tracking coils 5 and 6 in the magnetic field, a driving force is generated in the tracking direction T. Thereby, the tracking control can be executed.

Next, the printed coil substrates 3 will be explained with reference to FIG. 2. As shown, the printed coil substrate 3 includes the focus coil 4 and a pair of the tracking coils 5 and 6 of the same shape. Further, coil terminals 3a are printed at the portions on the printed coil substrates 3 other than the portion of the coils. On the printed coil substrates 3, the focus coil and the tracking coils are disposed close to each other for miniaturizing and reducing the weight of the actuator.

The focus coil 4 and the tracking coils 5, 6 are provided in a flat and symmetrical shape in the right and left direction, with respect to the focusing direction center lines 4a, 5a and 6a. The two tracking coils 5 and 6 are aligned in the tracking direction T shown in FIG. 1.

The coil terminals 3a are connected with the suspension wires 7 for supplying the driving current to the focus coil 4 and the tracking coils 5, 6. Four coil terminals 3a serves as the input terminal for the focus driving current, the output terminal for the focus driving current, the input terminal for the tracking driving current and the output terminal for the tracking driving current, respectively. Although connection lines for connecting the focus coil 4 and the tracking coils 5, 6 with the coil terminals 3a are printed on the printed coil substrates 3, they are not shown in FIG. 2.

Figure 3:
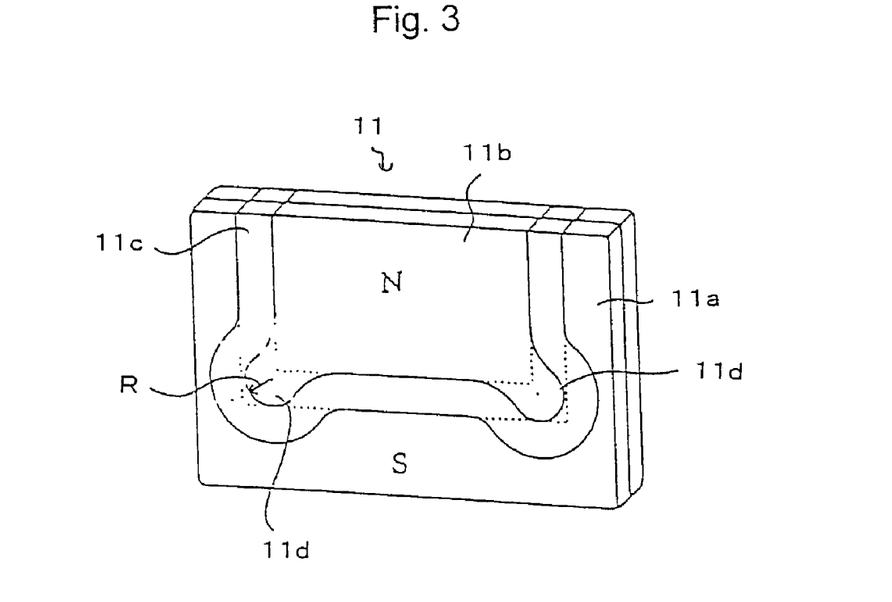
FIG. 3 is a diagram showing a magnetization pattern of the magnet used in the actuator of FIG. 1.

Next, with reference to FIG. 3, the magnetization pattern of the magnets 11 will be explained. The magnets 11 can be obtained by magnetizing a metal piece, such as iron or else, of a predetermined size using the magnetizing device later described. FIG. 3 shows the magnetization pattern of the magnets 11 after the magnetization. The magnetization patterns of the surface and the inside of the magnets are same as the cross-sectional shape of the magnetizing core later described, and a magnetic flux density distribution is formed corresponding to the magnetization pattern of the magnets at a position in the vicinity of the magnets 11 where the printed coil substrates 3 disposed.

In FIG. 3, the magnet 11 has an S pole area 11a, an N pole area 11b and a boundary area 11c at the boundary of them. The S pole area 11a has a shape surrounding the N pole area 11b from the three directions in a substantially "U" shape. However, the N pole area 11b is projected in the right downward and the left downward directions at two corner parts 11d in the lower part of FIG. 3. By magnetizing the magnets 11 in this shape, the magnetic flux density at the position of the printed coil substrates 3 disposed in the vicinity of the magnets 11 has a preferred distribution close to the right angle at the right downward and left downward corner parts of the "U" shape. In FIG. 1, the printed coil substrates 3 are disposed against the magnets 11 with an interval of several millimeters (for example, 0.3 mm).

Figure 4A:
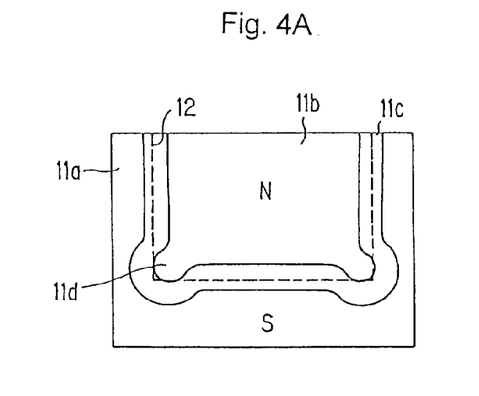
FIGS. 4A to 4D are diagrams showing the magnetization pattern of the magnet and the relative positional relationship of the coils of the printed coil substrate.
Figure 4B:
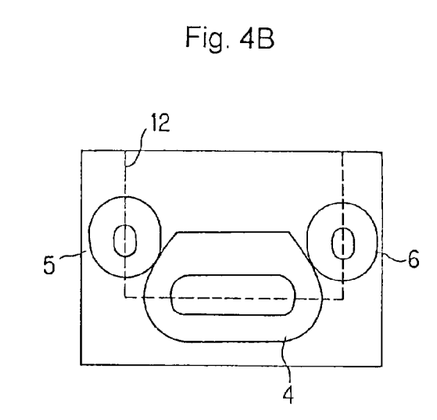

This will be explained in detail with reference to FIGS. 4A to 4D. FIG. 4A shows the magnetization pattern of the magnets 11 according to the present invention, wherein the two corner parts 11d of the N pole area 11b have a shape projecting outwardly. The broken line 12 in FIG. 4A schematically shows the boundary line of the N pole area and the S pole area in the magnetic flux density distribution formed at the position of the printed coil substrates 3 disposed in the vicinity of the magnets 11. FIG. 4B schematically shows the relative positional relationship between the boundary line 12 of the magnetic flux density distribution on the printed coil substrates 3, and the focus coil 4 and the tracking coils 5 and 6 in the case where the magnets 11 and the printed coil substrates 3 are disposed adjacently as shown in FIG. 1.

As shown in FIG. 4A, by forming the magnetization pattern of the magnets 11 in a shape projecting at the right and left corner parts of the lower end (see 11d), the boundary line 12 of the magnetic flux density distribution formed on the printed coil substrates 3 can have substantially the right angle at the two corner parts. Therefore, as shown in FIG. 4B, the boundary line 12 of the magnetic flux density distribution in the actuator 100 is provided so as to be positioned in the substantially center of the focus coil 4 and the tracking coils 5 and 6. Therefore, the vector of the driving force of the lens holder 2 in the focusing direction F generated by the driving current provided in the tracking coils 5, 6 is offset between the two tracking coils 5 and 6 so that the lens holder 2 can be driven by the tracking coils 5 and 6 correctly only in the tracking direction T.

Figure 4C:
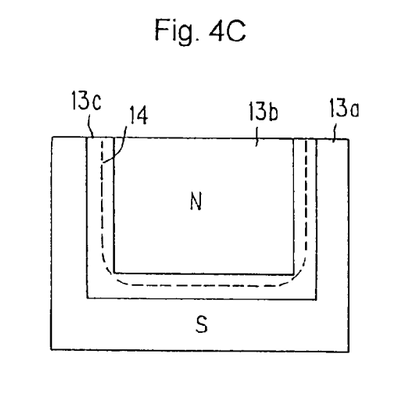

FIG. 4C shows the boundary line 13 of the magnetic flux density distribution generated at the position of the printed coil substrates 3 in the case where the magnetization pattern itself of the magnets is provided in a simple "U" shape, for comparison. That is, in the case where a magnet is magnetized in a magnetization pattern including a rectangular N pole area 13b, a substantially "U" shaped S pole area 13a and a boundary area 13c therebetween, the boundary line of the magnetic density distribution generated at the position of the printed coil substrates disposed in the vicinity of the magnets cannot form the right angle at the two corner parts in the lower part as shown by the broken line 14, and forms a shape recessed to the inner part of the N pole area 13b. This is because irregularity is generated generally in the magnetic flux density distributed in the magnetizing core at a corner part so that the magnetic flux density is lowered. Therefore, in the case where the magnetization pattern of the magnet itself is formed in a "U" shape as shown in FIG. 4C, the magnetic flux density distribution on the printed coil substrates disposed with an interval of several millimeters from the magnets has an insufficient magnetic flux density at the lower corner parts of the "U" shape, i.e., a curved corner part as shown by the boundary line 14. Although it is necessary to apply a high voltage instantaneously for having a magnetic flux density close to the right angle in this part, too much load is applied on the magnetizing coils if an excessively high voltage is applied, possibly causing breakage of the coil pattern. Thus, it is difficult to produce a magnetic flux density distribution close to the right angle at the position of the printed coil substrates by the magnetization pattern shown in FIG. 4C.

Figure 4D:
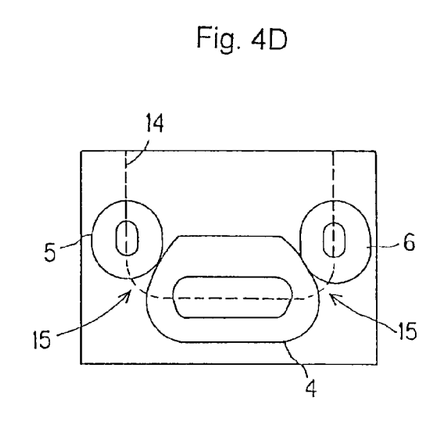

FIG. 4D shows the relative positional relationship between the boundary line 14 of the magnetic flux density distribution generated at the position of the printed coil substrates by the magnets of the magnetization pattern shown in FIG. 4C, and the focus coil 4 and the tracking coils 5, 6. In this case, the boundary line 14 of the magnetic flux density in the vicinity of the lower end parts of the two tracking coils 5 and 6 is curved inward (see the arrow 15 part), the component in the upper and lower direction (that is, the focusing direction) of the driving force generated in the two tracking coils cannot be offset by each other, so that a rotation force is generated in the lens holder 2. As a result, a problem of deterioration of the sensitivity and the rolling characteristic due to tilt of the actuator can be generated.

According to the present invention, since the magnetization pattern by the magnetizing core of the magnets 11 is provided so as to be projected outward at the corner parts, the boundary line of the magnetic flux density distribution generated at the position of the printed coil substrates disposed in the vicinity of the magnets can be formed in a substantially ideal right angle at the two lower end parts, and hence a correct magnetic field can be provided to the tracking coils formed on the printed coil substrates. Thereby, a problem of application of a rotation force to the lens holder, or the like can be prevented.

Furthermore, according to a preferable embodiment of the present invention, the area lid projecting outward is formed in an arc-like shape. Thereby, shaping of the magnetizing cores can be facilitated as later described, and furthermore, a problem of the breakage of the magnetizing coils, or the like can be prevented.

[2] Magnetizing Device

Figure 5A:
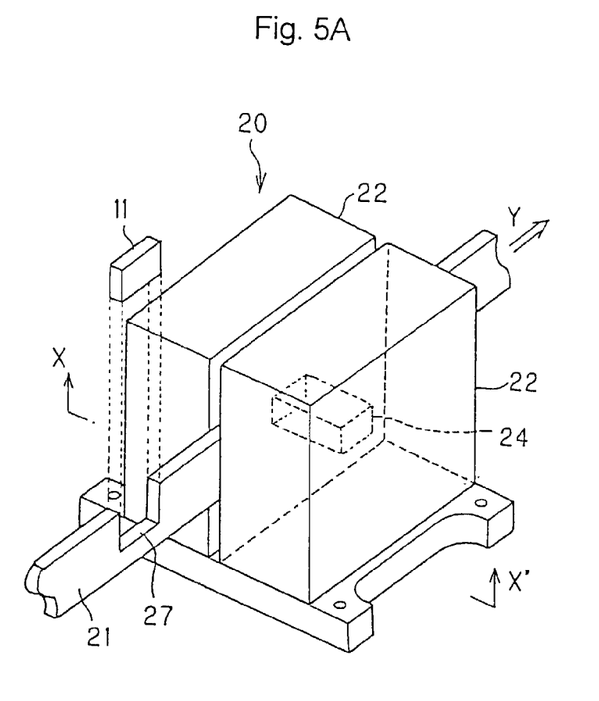
FIGS. 5A and 5B are perspective views showing a magnetizing device used for magnetizing the magnet shown in FIG. 3.

Next, the magnetizing device will be explained with reference to FIGS. 5A, 5B and FIG. 6. FIG. 5A shows the magnetizing device 20 according to the present invention. The magnetizing device 20 has two magnetizing yokes 22 facing with each other, and a blade 21 inserted therebetween. A magnetizing core 24 is mounted inside of each of the magnetizing yokes 22.

The blade 21 can be inserted into the slit between two magnetizing yokes 22 facing with each other. A recess part 27 is formed in the blade 21 for receiving the magnet 11 (specifically, since it is before the magnetization, it is a magnetic substance 11 such as an iron piece). The blade 21 is provided movable by sliding in the arrow Y direction in FIG. 5A. By sliding and moving the blade 21 in the arrow Y direction for disposing the magnetic substance 11 at the magnetizing core 24 position and applying a high voltage to the magnetizing core 24, the magnetic substance 11 is magnetized.

Figure 5B:
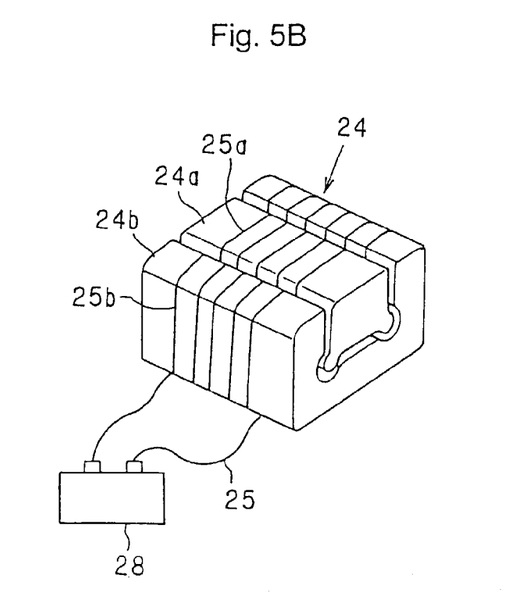

FIG. 5B shows the magnetizing core 24. The magnetizing core 24 according to the present invention is provided as a combination of a magnetizing core 24a for the N pole and a magnetizing core 24b for the S pole. The magnetizing core 24a for the N pole is for generating the N pole area 11b of the magnet 11 shown in FIG. 3, and the magnetizing core 24b for the S pole is for generating the S pole area 11a of the magnet 11 shown in FIG. 3. Therefore, the vertical cross-sectional shape of the magnetizing core 24a for the N pole in FIG. 5B coincides with the shape of the N pole area 11b shown in FIG. 3, and the vertical cross-sectional shape of the magnetizing core 24b for the S pole in FIG. 5B coincides with the shape of the S pole area 11a shown in FIG. 3.

Around the magnetizing cores 24a and 24b, the magnetizing coils 25a and 25b are wound for several turns. The magnetizing coils 25a and 25b are connected in series, and are connected with a magnetizing power source 28. The winding direction of the magnetizing coil 25a around the magnetizing core 24a and the winding direction of the magnetizing coil 25b around the magnetizing core 24b are opposite. Thereby, the magnetizing cores 24a and 24b have different poles (N pole and S pole). By apply a high voltage power from the magnetizing power source 28 to the coils in a short time, a magnetic flux is generated in the magnetizing cores 24a and 24b to magnetize the magnet 11. Since a gap for winding the magnetizing coils 25a and 25b is provided between the magnetizing cores 24a and 24b so that the magnetic substance 11 cannot be magnetized in this area, a boundary area 11c as shown in FIG. 3 can be formed in the magnetization pattern of the magnet 11.

The structure of the magnetizing core 24 according to the present invention can also provide the effect of improving the durability of the magnetizing coil to be wound around on the magnetizing core 24a. As mentioned above, in the present invention, the magnetizing core 24a has a shape with the lower end two corner parts curved in an arc-like shape, projecting outward. In other words, at the corner parts of the magnetizing core 24a, the center of the arc of the projection part is disposed outward of the center of the arc in a case that the corner part ordinarily in the right angle is substituted by an arc having a 90 degree center angle. Therefore, the coil 25a is wound around on the curved surface of the projected part.

When the corner part of the magnetizing core is formed in the right angle or an acute angle, since the mechanical stress is concentrated at the corner part of the magnetizing coil wound around thereon, the magnetizing core is often broken at the time a high voltage is applied. In contrast, since the lower end two corner parts of the magnetizing core 24a of the present invention have an arc-like curved cross-sectional shape, concentration of the mechanical stress to the magnetizing coil to be wound around can be alleviated, and hence the possibility of the breakage of the magnetizing coil can be lowered. Moreover, by forming the two corner parts of the magnetizing core 24a in an arc-like shape, compared with the case of forming in a curved shape other than the arc-like shape, it is advantageous in that shaping of the magnetizing core itself can be facilitated.

Figure 6:
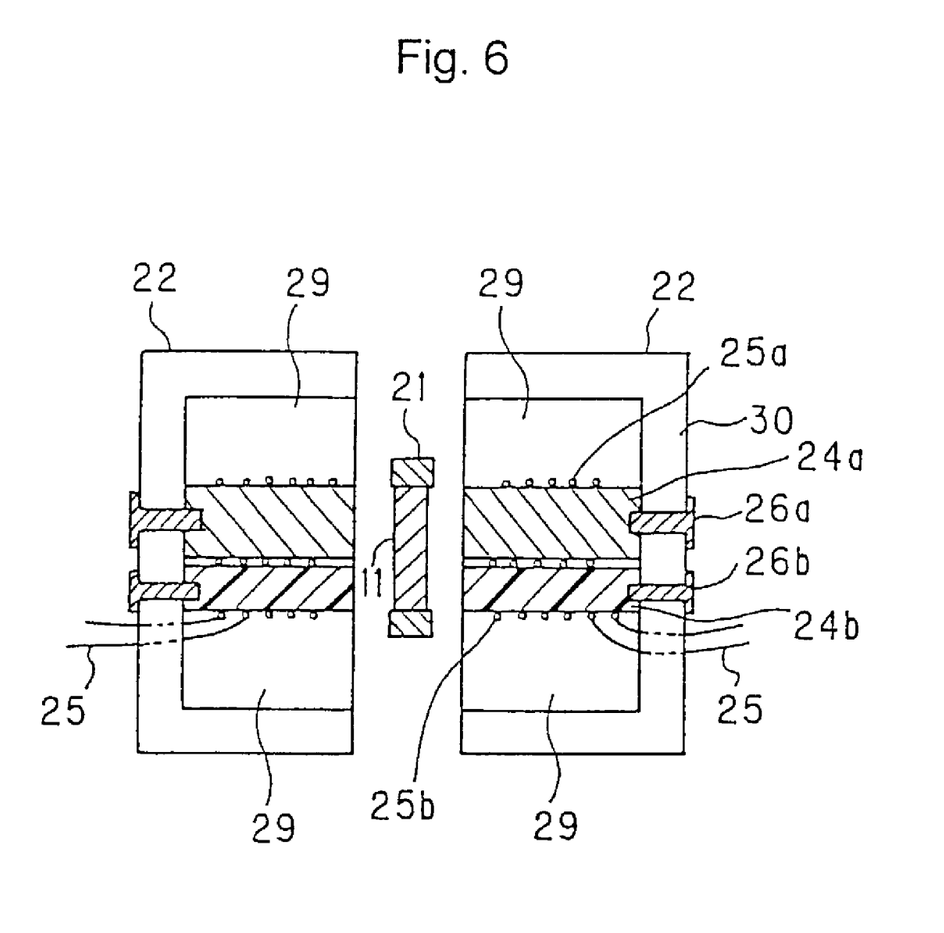
FIG. 6 is a cross-sectional view showing the structure of a magnetizing yoke shown in FIG. 5A.

FIG. 6 shows the cross-section of the magnetizing device 20 at the line X–X' in FIG. 5A. Two magnetizing yokes 22 are disposed symmetrically with respect to the blade 21. As shown in FIG. 6, the magnetizing yokes 22 have a structure with the magnetizing cores 24a and 24b attached to the inside wall of a hollow metal such as a brass by screws 26a and 26b. As also seen in FIG. 5A, the magnetizing coils 25a and 25b are wound around the magnetizing cores 24a and 24b, and the electric lines constituting the magnetizing coils are taken out to the outside of the magnetizing yokes 22 to be connected with the magnetizing power source 28. Moreover, in a part 29 inside the magnetizing yokes 22 other than the part with the magnetizing core 24 fixed, an epoxy resin, or the like is injected and hardened so as to prevent the movement the magnetizing core 24.

Next, the magnetizing process of the magnet (magnetic substance) by the magnetizing device 20 shown in FIG. 5A will be explained. First, the magnetic substance 11 to be processed is inserted into the recess part 27 of the blade 21. Then, the blade 21 is moved by a predetermined distance in the arrow Y direction and the movement of the blade 21 is stopped when the magnetic substance 11 is disposed between the two magnetizing cores 24 in the two magnetizing yokes 22 facing with each other.

When the position of the magnetic substance 11 is thus determined, a high voltage is applied by the magnetizing power source 28 to the coils 25a and 25b for a short time. By the high voltage application, a magnetic flux is generated in the magnetizing cores 24a and 24b, and the magnetic substance 11 is magnetized by the magnetic flux, becoming a magnet. As shown in FIG. 3, the magnetization pattern of the magnet 11 is same as the cross-sectional shape of the magnetizing cores 24a and 24b.

After producing the magnet 11 in this way, the blade 21 is moved in the direction opposite to the arrow Y by a predetermined distance until the recess part 27 of the blade 21 comes out of the slit between the magnetizing yokes 22, and the magnet 11 is taken out of the recess part 27.

In this way, by applying a high voltage to the coils 24a and 24b of the magnetizing core 24 with the magnetizing cores 24 of the shape shown in FIG. 5B disposed facing with each other and the magnet 11 disposed therebetween, a magnet 11 magnetized according to the magnetizing core 24 can be obtained.

MODIFIED EMBODIMENTS

Figure 7A:
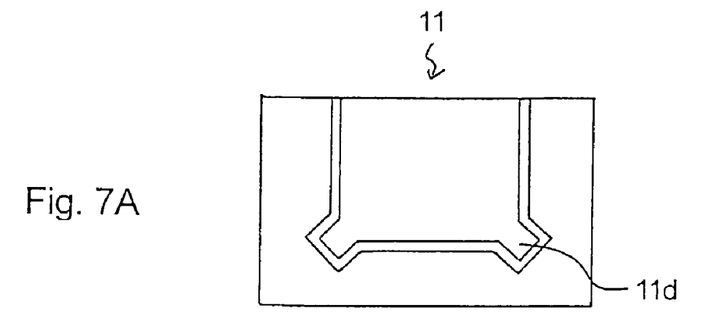
FIGS. 7A to 7C are diagrams showing modified examples of the magnetization pattern of the magnet.
Figure 7B:
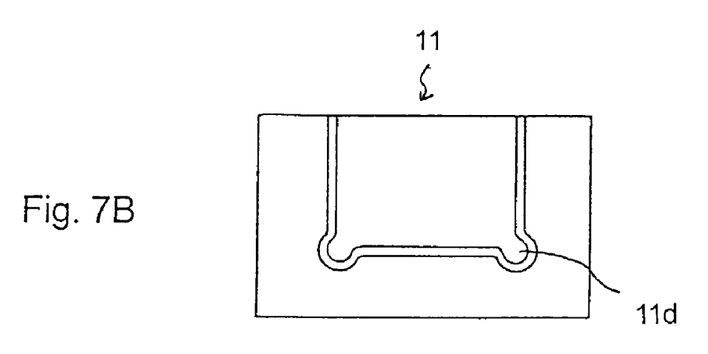

Although the magnetization pattern of the magnet, that is, the cross-sectional shape of the magnetizing core is provided in a configuration with the N pole area projecting obliquely outward in an arc-like shape at the lower end two corner parts lid in the above-mentioned embodiment, application of the present invention is not limited to the embodiment. For example, as shown in FIGS. 7A and 7B, the corner parts lid can be provided in a shape projecting outward in a polygonal shape instead of the arc-like shape. Thereby, the actual boundary line of the magnetic flux density distribution on the printed coil substrate disposed in the vicinity of the magnet can be provided in a preferable shape close to the right angle at the corner parts lid like the boundary line 12 of FIG. 4A.

When the corner parts are provided in a square shape as shown in FIG. 7A, the mechanical stress applied on the magnetizing coil is relatively large as mentioned above. However, since the vertex angle of the polygons can be enlarged by providing the corner parts in a hexagonal shape or an octagonal shape as shown in FIG. 7B, the corner part lid shape can be close to an arc so as to alleviate the mechanical stress applied on the magnetizing coil.

Figure 7C:
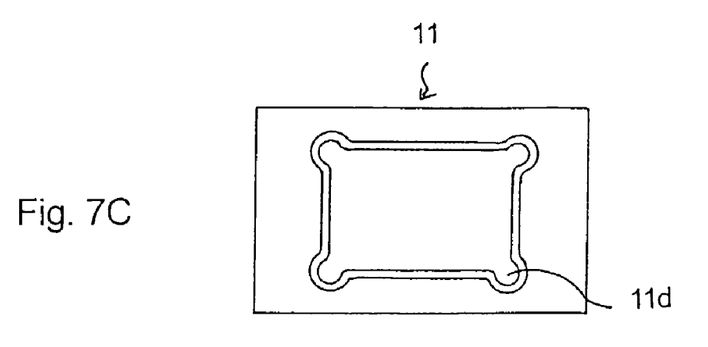

Moreover, in the above-mentioned embodiment, although the inner side pole area is projected outward at the two corner parts lid of the "U"-shaped magnetization pattern, this method of the present invention can be applied to any corner part of a magnetization pattern. For example, also in the case of forming a magnetization pattern of an "L" shape or an inverted "L" shape using one of the right and left sides of the magnetization pattern shown in FIG. 3 or a magnetization pattern of an "O" shape having four corners as shown in FIG. 7C in the magnet, by providing the shape with the inner side pole area projecting outward at the four corner parts, the real magnetic flux density distribution can be provided ideally at each corner part of the magnet. Therefore, the method of the present invention can be adopted according to the arrangement of a focus coil and a tracking coil in various actuators.

As heretofore explained, according to the present invention, since the magnetization pattern of the magnet is provided in a shape with the inner side pole area projecting outward at the corner parts, the real magnetic flux density distribution generated on the printed coil substrate disposed in the vicinity of the magnet can be a substantially ideal distribution at the corner parts. Therefore, the actuator characteristics can be improved.

Moreover, by providing the magnetizing core corner part of the magnetizing device with an arc-like curved shape, breakage of the magnetizing coil or the like can be reduced so that the durability of the magnetizing device can be improved.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Applications No. 2001-232824 filed on Jul. 31, 2001 including the specification, claims, drawings and summary is incorporated herein by reference in its entirety.

What is claimed is:

1. An actuator for an optical pickup, comprising
   two magnets each having a magnetization pattern comprising two different pole areas adjacent with each other, wherein at a corner part defined by two line segments constituting a boundary line of the two pole areas, the pole area inside the corner part has a projection area which projects in the direction of the pole area outside the corner part;
   a lens holder having an objective lens and two coil substrates mounted on its side surface; and
   a holding device for holding the lens holder movably between the magnets such that the two coil substrates face each of the two magnets,
   wherein the coil substrates have a focus coil and two tracking coils, and wherein the boundary line of the two pole areas has three straight line parts and two corner parts defined by the three straight line parts such that the lens holder is held by the holding device such that one of the three straight line parts faces the focus coil and the other two of the three straight line parts face each of the two tracking coils.

2. The actuator according to claim 1, wherein the projection area has a planar shape of an arc.

3. The actuator according to claim 2, wherein the center of the arc is provided outside of a corner part of another arc which is defined by connecting two straight lines forming the corner part with an arc.

4. The actuator according to claim 1, wherein the projection area is formed in a polygonal planar shape.

5. The actuator according to claim 1, wherein at the corner part with the projection area disposed, the magnetization pattern of each of the two magnets is formed such that a boundary line of the magnetic flux density distribution at a predetermined distance from the magnet substantially coincides with an intersection shape of the two straight lines of the boundary line of the two pole areas defining the corner part.

* * * * *